April 20, 1948. V. F. MABLI 2,440,179
TWINE MOISTENING AND DISPENSING DEVICE
Filed Feb. 6, 1945
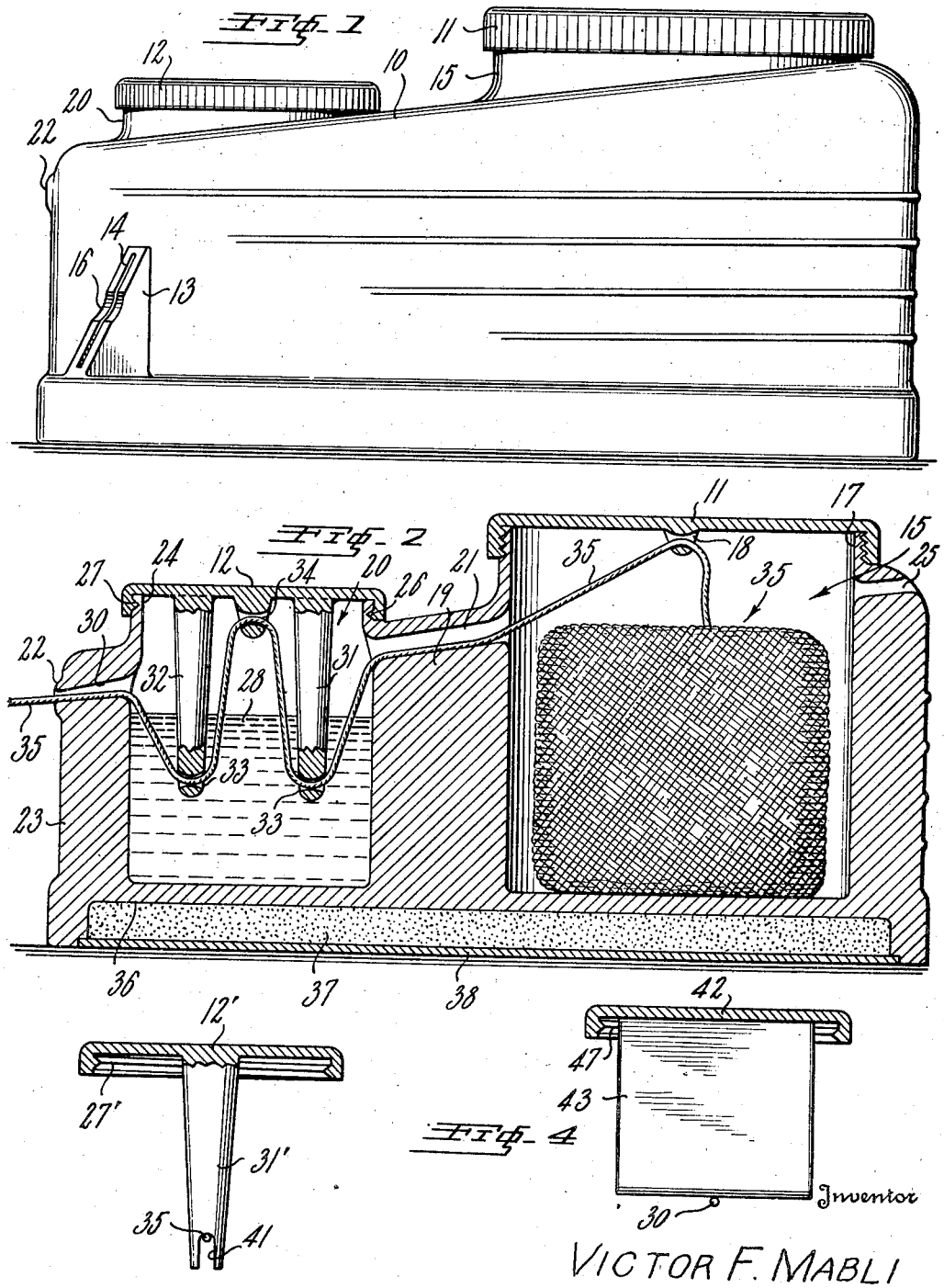
Inventor
VICTOR F. MABLI
By Alfred E. Page
Attorney Patented Apr. 20, 1948

2,440,179

UNITED STATES PATENT OFFICE 2,440,179

TWINE MOISTENING AND DISPENSING DEVICE

Victor F. Mabli, Tarrytown, N. Y.

Application February 6, 1945, Serial No. 576,432

3 Claims. (Cl. 91—46)

This invention relates to dispensing devices, and more particularly to a twine dispenser for maintaining a supply of twine for food wrapping in a sanitary condition and adapted to progressively wet lengths of the twine as the twine is withdrawn from the dispenser.

The invention is particularly useful in the meat trade, wherein various meats such as pot roasts, boned roasts, poultry, legs of lamb, etc., are trussed with twine to maintain their shape. In order to effectively truss such meat cuts, the twine is desirably wet before it is tied around the meat.

Hitherto, no effective means has been provided for wetting the twine as it is used for wrapping the meats. Among various expedients hitherto used is that of estimating the required length of twine, pulling it off from the ball or cone, and cutting it off by hand before wetting the twine to wrap the meat. This expedient is not only wasteful of twine, but is also time consuming.

Alternatively, the entire roll of twine has been wet, either by immersion in water or other means. When the entire roll of twine is wet, the portion not used becomes mildewed and has an offensive odor making it unsuitable for further use on meat, or any other type of meat product.

It is among the objects of this invention to provide means for maintaining a supply of twine in a sanitary, clean and handy condition; to provide a sanitary, clean and handy twine dispenser including means for progressively dispensing twine therefrom; to provide a sanitary twine enclosing dispenser including means for progressively wetting twine as it is withdrawn therefrom; to provide a twine dispenser comprising a unitary casing formed to maintain a supply of twine in a sanitary condition and to progressively wet the twine as it is withdrawn from the casing; to provide a twine dispenser comprising a unitary, sanitary twine enclosing casing having a twine compartment, a liquid compartment, a twine inlet passage, a twine outlet passage; and means associated with the casing for guiding the twine through liquid in the liquid compartment as the twine is withdrawn from the casing; to provide such a twine dispenser including a cover for the liquid well provided with means for guiding the twine through liquid in the well as the twine is withdrawn from the casing; to provide such a dispenser including cooperating means on the casing and liquid well cover for aligning guide means on the cover with twine withdrawing passages; and to provide a simple, inexpensive unitary and sanitary twine dispenser for progressively wetting twine as it is withdrawn for use.

These and other objects, advantages and novel features of the invention will be apparent from the following description and accompanying drawing. In the drawing:

Fig. 1 is a side elevation view of a twine dispenser according to the present invention.

Fig. 2 is a longitudinal sectional view through the dispenser shown in Fig. 1.

Figs. 3 and 4 are elevation views, partly in section of modified forms of twine guiding liquid well covers.

Generally speaking, according to the present invention, a unitary casing is formed of any suitable material such as glass, synthetic resins, metals or other suitable materials. Desirably, the casing is molded from a suitable plastic having characteristics adapting it for relatively rough usage, as well as being attractive in appearance. The casing is formed with a pair of wells, located adjacent each other. One of the wells forms a sanitary enclosure for a supply of twine, such as a ball of twine, and the other well is adapted to hold a supply of liquid, such as water, if it is desired to progressively wet the twine as it is withdrawn from the twine well. Passage means are formed in the casing interconnecting the wells, and also connecting the liquid and twine wells to the exterior of the casing. Covers are provided for both the wells, and the liquid well cover is formed with means projecting downwardly into the well and adapted to guide the twine, as it is withdrawn from the twine well, through liquid in the liquid well to progressively wet the twine as it is withdrawn from the dispenser. The casing is preferably formed with a recessed bottom wall to contain sand or other weighting material to provide stability for the casing on its support. As an additional feature, during manufacture the casing may be provided with suitable means such as slots adapted to hold razor blades or other cutting implements for cutting off desired lengths of twine.

Referring to the drawing, twine dispenser 10 is shown as comprising a unitary casing having a twine well or compartment 15, a well or compartment 20 adapted to contain liquid, a twine inlet 25 and a twine outlet 30. Covers 11 and 12 are provided for wells 15 and 20. The casing may also be formed with a rib or fillet 13 provided with a slot 14 for receiving a razor blade or other suitable implement for cutting off desired lengths of twine. The outer edge of pocket 13 is recessed as at 16 to enable a user to grip a razor blade inserted in slot 14.

Referring to Fig. 2, well 15 is preferably generally cylindrical in shape and provided with a neck 17 screw threaded to receive cover 11. Well 15 is adapted to contain a ball of twine 35. Twine 35 is withdrawn from the center of the ball to prevent collapsing thereof and is guided through an eyelet 18 integral with cover 11. If twine 35 is wound in a cone too tall to fit in well 15, the cone is supported outside casing 10, as on a spindle, and twine 35 is threaded through inlet 25 and eye 18. At least the portion of twine 35 in casing 10 is thus maintained in a sanitary condition.

A wall 19 separates twine well 15 from liquid well 20, and a passage 21 is formed through wall 19 for guiding twine 35 from well 15 to well 20. Twine outlet passage 30 extends outwardly from well 20 through the front wall 23 of casing 10, and is formed with a nozzle portion 22.

Well 20 is likewise desirably cylindrical in shape, although any desired configuration may be used. Well 20 is provided with a neck 24 having a partial thread 26 adapted to cooperate with a thread 27 on a cover 12. Threads 26 and 27 are so related that only a quarter turn of cover 12 is necessary to connect the cover to neck 24. The purpose of this arrangement will be apparent hereinafter. Well 20 is adapted to contain suitable supply of liquid, such as water, indicated at 28.

Means are provided in operative association with well 20 for guiding twine 35 through liquid 28 as the twine is withdrawn from well 15 through well 20 and out through nozzle 22. As shown in Fig. 2, this means comprises spaced fingers 31 and 32 formed integrally with cover 12 and extending downwardly to a point near the bottom of the well. Fingers 31 and 32 are formed with eyes 33 for guiding twine 30. An eye 34 is formed integral with cover 12 between fingers 31 and 32 and along with eyes 33. As will be noted in Fig. 2, twine 35, in passing between the two eyes 33 goes through eye 34. Therefore, the twine is immersed in water 28 for a greater length of time than it would otherwise be if only a single finger 31 were provided with dispensing the twine beneath the surface of the water.

The operation of the described device is as follows. Covers 11 and 12 are removed from the device, and liquid well 20 is filled with liquid 28 to a point slightly below the level of outlet passage 22. A ball of twine 35 is placed in twine well 15 and the end of the twine withdrawn from the center of the ball is guided through eye 18 on cover 11 and through passage 21. Thereafter, cover 11 is securely fastened to neck 17 of well 15 to enclose the twine therein. Twine 35 is then guided, in sequence, through eye 33 of finger 31, eye 34 and eye 33 of finger 32 and thence outwardly through passage 25. When cover 12 is place on neck 24 of well 20, eyes 33 and 34 will have their openings extending transversely of the well with respect to passages 21 and 25. However, when cover 12 is screwed on to neck 24 through interengagement of threads 26 and 27, only a quarter turn of cover 12 with respect to well 20 is provided, which effectively aligns eyes 33 and 34 with passages 21 and 25. When cover 12 is fastened to well 20, the portion of twine 35 between passages 21 and 25 is submerged at least twice beneath the water or other liquid is well 20 by reason of its threading through eyes 33 and 34 to insure thorough wetting of the twine.

As twine 35 is withdrawn from nozzle 22, a corresponding amount is wet by passage through liquid 28 in well 20. The twine is thus progressively wet as it is withdrawn from casing 10. The amount of twine submerged in liquid 28 corresponds exactly to the amount of twine withdrawn from nozzle 22. Therefore, the end of twine 35 may be grasped and the meat wrapping done by withdrawing the twine from nozzle 22. When the wrapping is completed, the twine is cut, as by the razor disposed in slot 14. As distinguished from prior art expedients, it is not necessary to estimate the amount of twine necessary for wrapping a particular piece of meat and then wet the same by hand. It is merely necessary to withdraw the twine from the dispenser as it is used and in the exact amount needed. The remainder of the twine in well 15 is not wet during this procedure, and this twine is maintained in a dry condition whereby it is effectively adapted for future use. The result is an efficient and economical progressive wetting of the twine only in the amount needed for actual use in a given time.

Desirably, the bottom of dispenser 10 is recessed as at 36 to receive a supply of sand, water, or other weighting material 37 which is designed to make the dispenser weigh enough so that it will have stability upon a supporting surface. A bottom cover plate 38 may be provided for space 36 to seal the sand, water or other weighting means therein. If desired, cover plate 38 may be provided with a suitable plug (not shown) for replenishing the supply of material in space 36, if necessary.

Figs. 3 and 4 illustrate alternative arrangements for submerging twine 35 in liquid 28. In Fig. 3, cover 12' is provided with a finger 31' formed with a guiding slot 41 for twine 30. In the same manner as described in connection with Fig. 2, when cover 12' is turned a quarter turn to engage its thread 27' with the thread 26 of well 20, slot 41 will be aligned with passages 21 and 25.

In Fig. 4, cover 42 is provided with a rib 43 adapted to extend into liquid 28 and guide twine 35 through the liquid. As in the two previous examples, rib 43 will be disposed transversely with respect to passages 21 and 25 when cover 42 is secured to well 20 by engagement of its thread 47 with thread 26 of neck 24. The arrangements of Figs. 3 and 4 have an advantage over that shown in Fig. 1 in that it is not necessary to thread the twine 35 through eyes 33. It is merely necessary to engage slot 41 or rib 43 with the twine and then screw covers 12' or 42 in place.

The described arrangement provides an effective means for maintaining twine in a sanitary condition pending its use in wrapping food products. The dispenser may be used either with a ball of twine or with a cone of twine. If a ball of twine is used, the latter is fully enclosed within compartment 15 and the twine 35 is withdrawn from the center of the roll to prevent collapsing thereof. When the dispenser is used with a cone of twine and the cone is too large to fit within compartment 15, the twine from the cone is threaded through inlet 25 and at least that portion of the twine in the dispenser is maintained in a sanitary condition prior to use. The dispenser may be used with or without water in compartment 20. When used without water, it forms a sanitary enclosure for the twine, protecting it from the action of the elements and maintaining it in a clean and handy condition. When water is added to compartment 28, the twine is progressively wet as it is withdrawn from the dispenser which increases the facility with which the twine is used to wrap various meat products.

The dispenser is economical in use, as only necessary lengths of twine need be withdrawn therefrom, as they are used, with the main supply of twine being maintained in a sanitary condition. The unitary casing 10 provides an attractive, easily handled device for dispensing twine and may be readily manufactured by injection molding, die casting, or by any other suitable process, and from a variety of material such as glass, synthetic resin and other materials.

While specific embodiments of the invention have been shown and described in order to illustrate the principles thereof, it will be understood that the invention may be otherwise embodied without departing from such principles.

What is claimed is:

1. A twine wetter and dispenser comprising a unitary casing formed with a twine compartment, a water compartment adjacent thereto, a passage connecting said compartments to provide for twine to be withdrawn from said twine compartment into said water compartment and a passage opening externally from said water compartment to provide for twine to be withdrawn from said casing; a cover for said water compartment; spaced fingers integral with said cover projecting into said water compartment and formed at their inner ends with eyes to guide the twine through water in said water compartment to wet the twine as the twine is withdrawn from said casing through the passage opening externally from said water compartment; eye means integral with said cover between said fingers to guide the twine therebetween; and cooperating means on said casing and cover effective to align said eyes with said passages when said cover is secured to said casing.

2. A sanitary twine dispenser comprising, in combination, a twine compartment; a water container; enclosure means for said compartment and container protecting twine and water therein from atmospheric contamination; guide means within said enclosure means effective to guide twine, from a supply thereof in said compartment, to said water container; means within said enclosure means in advance of said guide means and effective to guide the twine into said container; and passage means for withdrawing twine from said dispenser.

3. A sanitary twine dispenser comprising, in combination, a twine compartment; a water container; enclosure means for said compartment and container protecting twine and water therein from atmospheric contamination; guide means within said enclosure means effective to guide twine, from a supply thereof in said compartment, to said water container; finger means carried by said enclosure means effective to immerse the twine in water in said water container; and passage means for withdrawing twine from said dispenser.

VICTOR F. MABLI.

REFERENCES CITED

The following references are of record in the file of this patent:

UNITED STATES PATENTS

| Number | Name | Date |
|---|---|---|
| 131,786 | Sargent et al. | Oct. 1, 1872 |
| 666,182 | Cardwell | Jan. 15, 1901 |
| 667,820 | Esch | Feb. 12, 1901 |
| 924,683 | Marshall | June 15, 1909 |
| 1,203,294 | Will | Oct. 31, 1916 |
| 1,272,456 | Kamphefner | July 16, 1918 |
| 1,335,667 | Doering | Mar. 30, 1920 |
| 1,715,649 | Filsinger | June 4, 1929 |
| 1,810,007 | Fischer | June 16, 1931 |